US009680810B2

(12) United States Patent
Gilbert et al.

(10) Patent No.: US 9,680,810 B2
(45) Date of Patent: Jun. 13, 2017

(54) AUTHORIZATION OF DEVICE ACCESS TO NETWORK SERVICES

(71) Applicant: Microsoft Technology Licensing, LLC, Redmond, WA (US)

(72) Inventors: Mark Gilbert, Aachen (DE); Ron J. Mevissen, Kerkrade (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/752,665

(22) Filed: Jan. 29, 2013

(65) Prior Publication Data
US 2013/0205372 A1 Aug. 8, 2013

Related U.S. Application Data

(62) Division of application No. 11/201,232, filed on Aug. 10, 2005, now abandoned.

(51) Int. Cl.
H04L 29/06 (2006.01)
G06F 21/62 (2013.01)

(52) U.S. Cl.
CPC .......... *H04L 63/08* (2013.01); *G06F 21/6218* (2013.01); *G06F 2221/2101* (2013.01); *G06F 2221/2129* (2013.01); *G06F 2221/2149* (2013.01); *H04L 63/0853* (2013.01)

(58) Field of Classification Search
CPC ........ H04L 63/08; H04L 63/20; H04L 67/125
USPC ............................................. 713/168; 726/4
See application file for complete search history.

(56) References Cited

U.S. PATENT DOCUMENTS

| 5,850,446 | A | 12/1998 | Berger et al. |
| 6,163,772 | A | 12/2000 | Kramer et al. |
| 6,178,409 | B1 | 1/2001 | Weber et al. |
| 6,240,512 | B1 | 5/2001 | Fang et al. |
| 6,574,617 | B1 | 6/2003 | Immerman et al. |
| 6,772,331 | B1 * | 8/2004 | Hind et al. ............. 713/151 |
| 6,782,474 | B1 * | 8/2004 | Ylonen ................... 713/162 |

(Continued)

FOREIGN PATENT DOCUMENTS

EP 1505765 A1 * 2/2005

OTHER PUBLICATIONS

Saito, et al., "Optimistic replication," *Microsoft Research*, 2003, http://www.research.microsoft.com, 1-47.

(Continued)

*Primary Examiner* — Dao Ho
(74) *Attorney, Agent, or Firm* — Baker & Hostetler LLP

(57) ABSTRACT

Techniques are disclosed for authorization of devices entering a network. A new device entering a network sends an authorization request. Another device in the network may receive the request and prompt the user to approve the device. The user can use a device identifier provided by the new device in approving the new device. Assuming the identifier provided by the new device matches an identifier accessible by the authorizing device, the user authorizes the new device. A key is then generated for the new device, which allows access to an appropriate range of network services. Authorization decisions can be synchronized among the various devices in a network, so even if an authorizing device leaves the network, the new device key can be validated. A security service can be replicated in a new device once the device is authorized to access the network.

14 Claims, 8 Drawing Sheets

(56) References Cited

U.S. PATENT DOCUMENTS

| | | |
|---|---|---|
| 7,583,401 B2 | 9/2009 | Lewis |
| 7,606,838 B2 | 10/2009 | Tobies |
| 2002/0194483 A1 | 12/2002 | Wenocur et al. |
| 2003/0097564 A1 | 5/2003 | Tewari et al. |
| 2005/0005116 A1 | 1/2005 | Kasi et al. |
| 2005/0076217 A1 | 4/2005 | Lord et al. |
| 2006/0098649 A1 | 5/2006 | Shay |
| 2006/0106836 A1 | 5/2006 | Masugi et al. |
| 2006/0112425 A1 | 5/2006 | Smith et al. |
| 2006/0293034 A1* | 12/2006 | Armstrong ................. 455/414.1 |

OTHER PUBLICATIONS

Cox and Josephson, "File Synchronization with Vector Time Pairs," *Laboratory Computer Sciences*, www.lcs.mit.edu/publications/pubs/pdf/MIT-LCS-TM-650, 1-14, 2005.

\* cited by examiner

AUTHORIZATION OF DEVICE ACCESS TO NETWORK SERVICES

CROSS-REFERENCE TO RELATED APPLICATIONS

This application is a divisional of prior application Ser. No. 11/201,232, filed Aug. 10, 2005, the contents of which are herein incorporated by reference in their entirety.

BACKGROUND

Network security can be generally summarized as systems for controlling who can access what computing resources. For example, can a particular employee access a file with sensitive information? Will a software application or device with minimal built-in security safeguards be allowed to connect and retrieve data from a database?

A number of network security systems exist today in corporate environments. An exemplary system might provide outsiders with some low level of access to network resources, for example through web pages hosted by one or more web servers. For insiders, e.g., employees within the various corporate departments, user groups may be defined who have access to, and control over, the computing resources they need. For example, an accounting group may have access to spreadsheet programs and all accounting data, but may not have access to product development data, and furthermore may not have administrative control over network connection settings.

Network security administration in such a setting may be carried out by an Information Technology (IT) department with a number of highly trained professionals. The resources required by the IT department are justified by increased efficiency and loss prevention throughout the organization. In contrast, home networks and many other small business or less professionally managed networks, referred to herein as lightweight networks, may not have any network security. The lack of security in lightweight networks is a limiting factor in their development. Poor security erodes user confidence in allowing new devices to connect to their network, and in allowing operation of distributed applications.

Securing a lightweight network is difficult because there are less resources to devote to security procedures. Most home network owners, for example, don't want to manage or organize their network in any way. Furthermore, they don't like leaving a computer on twenty-four hours a day to act as an authentication machine. They also shun network security because they don't want to take the chance of a computer reboot or malfunction stopping some other process or device in the network. For example, if a home user in an electronically advanced home employed corporate-style network security, they run the risk of interruption when watching a movie, because of a malfunctioning computer responsible for network security. Similarly, a security issue may render light controls or other systems unresponsive, which may demand immediate attention.

Another significant problem in providing usable network security for lightweight networks is that devices are continually entering, leaving, and rejoining the network. Devices are turned off, rebooted, brought to work, brought home, purchased and brought home for the first time, and so forth. Users do not want to endure any lengthy network configuration process each time such events occur. Moreover, users generally don't want to be forced to add users and explicitly restrict/enable permissions before using services in the lightweight network or adding a new device. Users may want to set security policies for specific areas, but normally after everything in the network is running properly, and not as a requirement.

In light of these various considerations in network security, there is a need for systems and methods that enhance network security in dynamic environments where computing devices may enter and leave the network, with little need for management or possibility of security-related failure.

SUMMARY

In consideration of the above-identified aspects and developments in network security, systems and methods are provided for authorization of device access to network services. Once authorized, devices can access any allowed network services, and can leave and rejoin the network. A new device entering a network sends an authorization request to a security service. Another device in the network, an authorizing device which provides the security service, may receive the request and display a User Interface (UI) which prompts a user to approve the new device. The authorizing device may also broadcast the authorization request to other authorizing devices in the network. The user can use a new device identifier in approving the new device. If the new device identifier provided by the device matches a new device identifier available to the security service, the user authorizes the new device. A key is then generated for the new device, which allows access to an appropriate range of network services. Subsequent access to network services may be made by the new device so long as the key is valid. Authorization decisions can be synchronized among the various devices in the network, so even if the original authorizing device leaves the network, the new device key can be validated by other authorizing devices. New devices entering the network may have the security service replicated in the new device, so that they can also serve as authorizing devices.

Other advantages and features of the invention are described below.

DRAWINGS

The systems and methods for authorizing device access to network services in accordance with the present invention are further described with reference to the accompanying drawings in which:

FIG. 1 illustrates a network 100 of computing devices in which the invention may be implemented. As illustrated, computing devices 101-110 may be in the network 100, computing devices 120-122 may enter or rejoin the network 100, and computing devices 131-133 may exit the network 100. Software 150-152 for obtaining and/or authorizing access to network services may be implemented on any of the computing devices.

Figure 5:
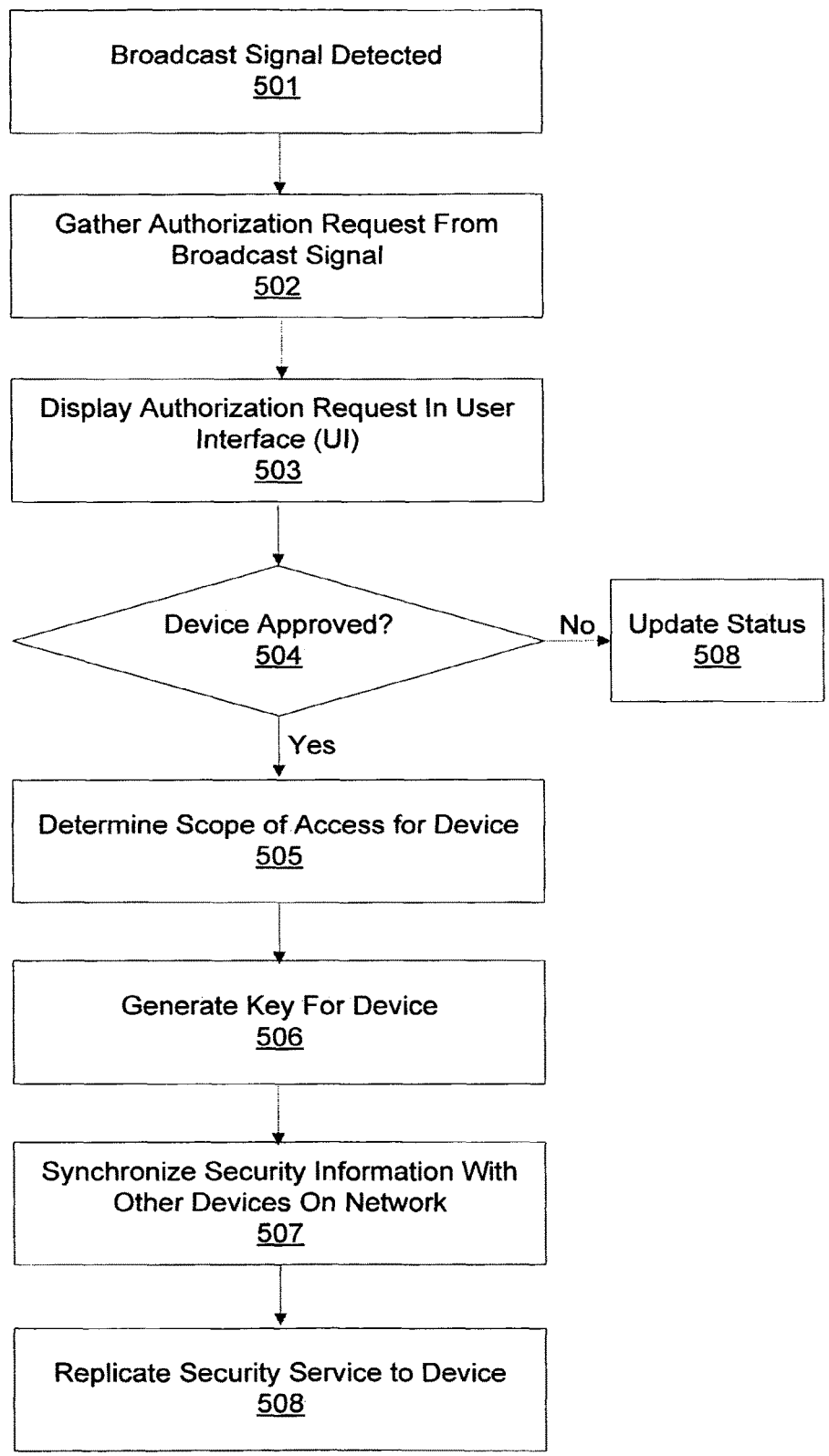

FIG. 5 provides a flow diagram illustrating a process for authorizing a computing device to access a network service.

Figure 6:
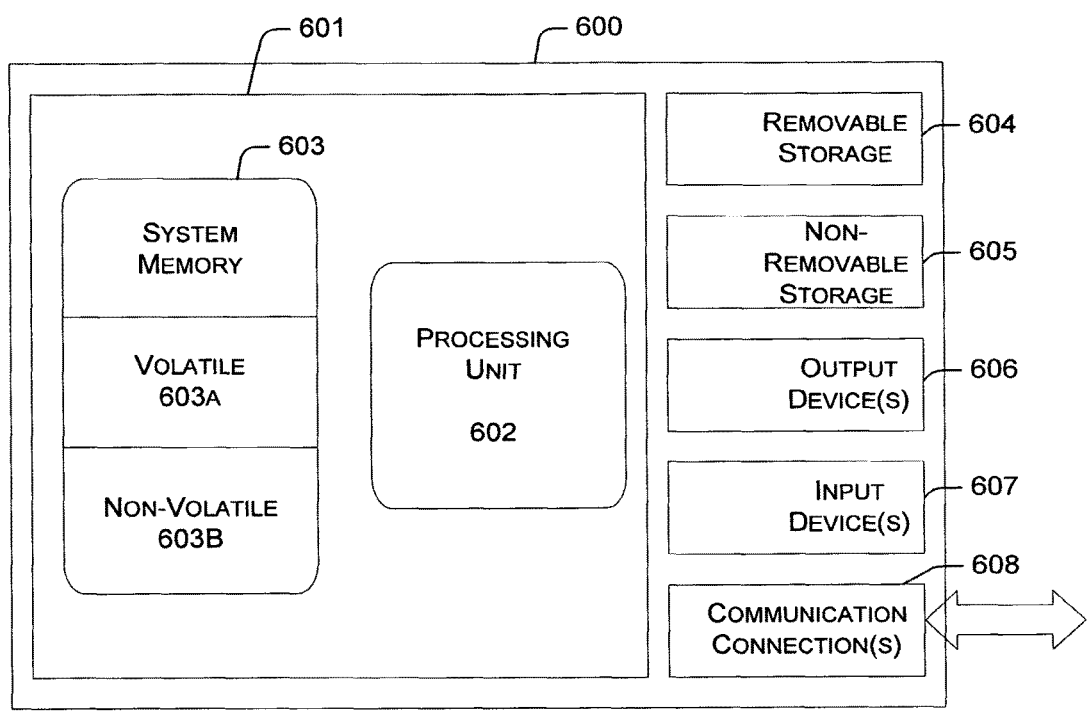

FIG. 6 illustrates a basic computing device to precisely point out the various elements of a computing device suitable for use in the context of the invention.

Figure 7:
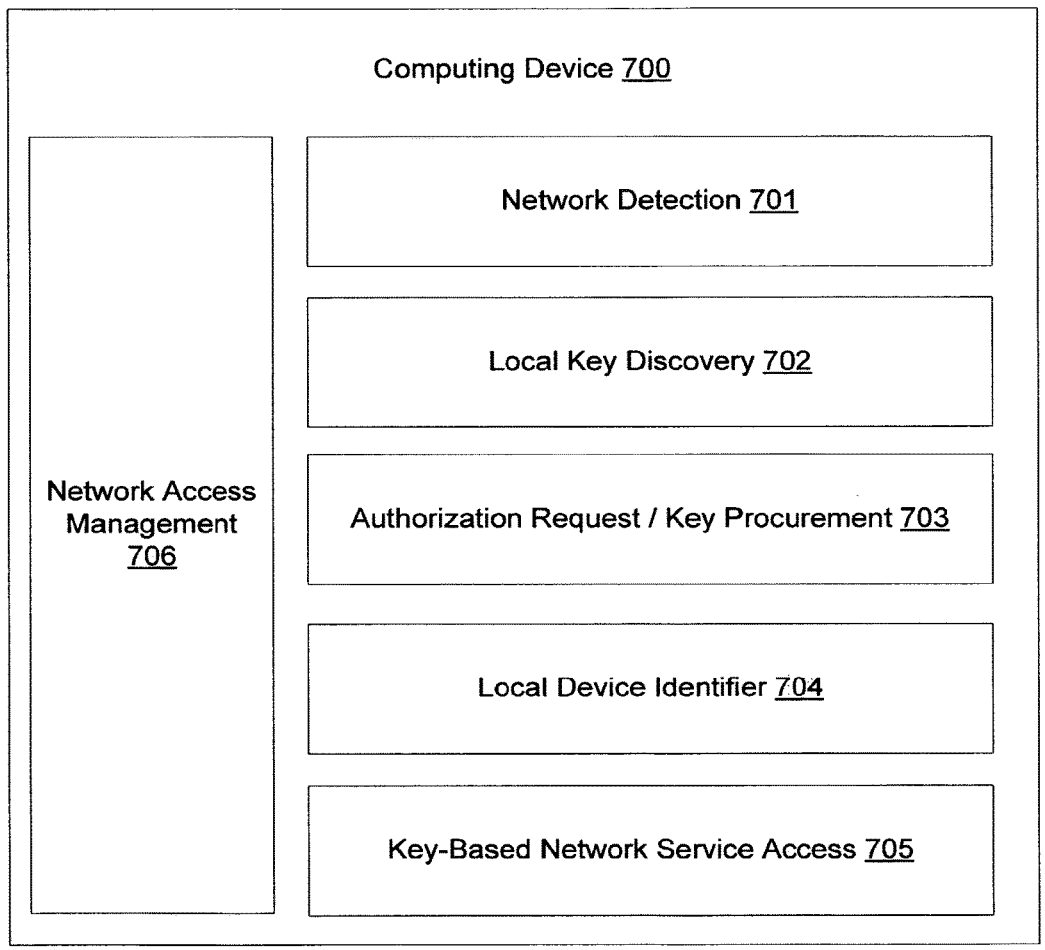

FIG. 7 illustrates various functional elements of a computing device which may be used in a process for obtaining authorization to access a network service.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The invention is a security mechanism and method that is designed around security and usability considerations for lightweight networks such as home and small business networks. Lightweight networks have unique requirements compared to traditional corporate or IT supported networks. There is often no central computing device running at all times, devices may regularly enter, leave, and rejoin the network, and the available resources for network administration are low.

In a lightweight network, there may be a number of devices communicating through web services or other network communication means. Web services are examples of network services, which may generally be understood as applications that may be accessed remotely by devices connected to a network. For example, a home lighting system may be controlled via an application on a networked computing device, and features and functions of the lighting system application may be accessible via the network. The lighting system application in such a scenario is a network service.

A network service may be hosted or provided by a particular networked computing device, such as a server. It may also be hosted by a plurality of computing devices in a distributed computing configuration. Furthermore, it may be hosted by a number of computing devices that may synchronize with one another from time to time to ensure proper cooperation.

One network service that will be referred to herein is a security service. A security service contemplated for use in conjunction with the invention comprises a number of security functions accessible to devices connecting to a network. The security service can provide a gateway through which devices must pass in order to access other network services. This is implemented by issuing a key that must be used to access secured network services. Functions of the security service may comprise device authorization, device validation, synchronization of security information, and replication of security service functionality. These functions will be described in detail below.

Figure 1:
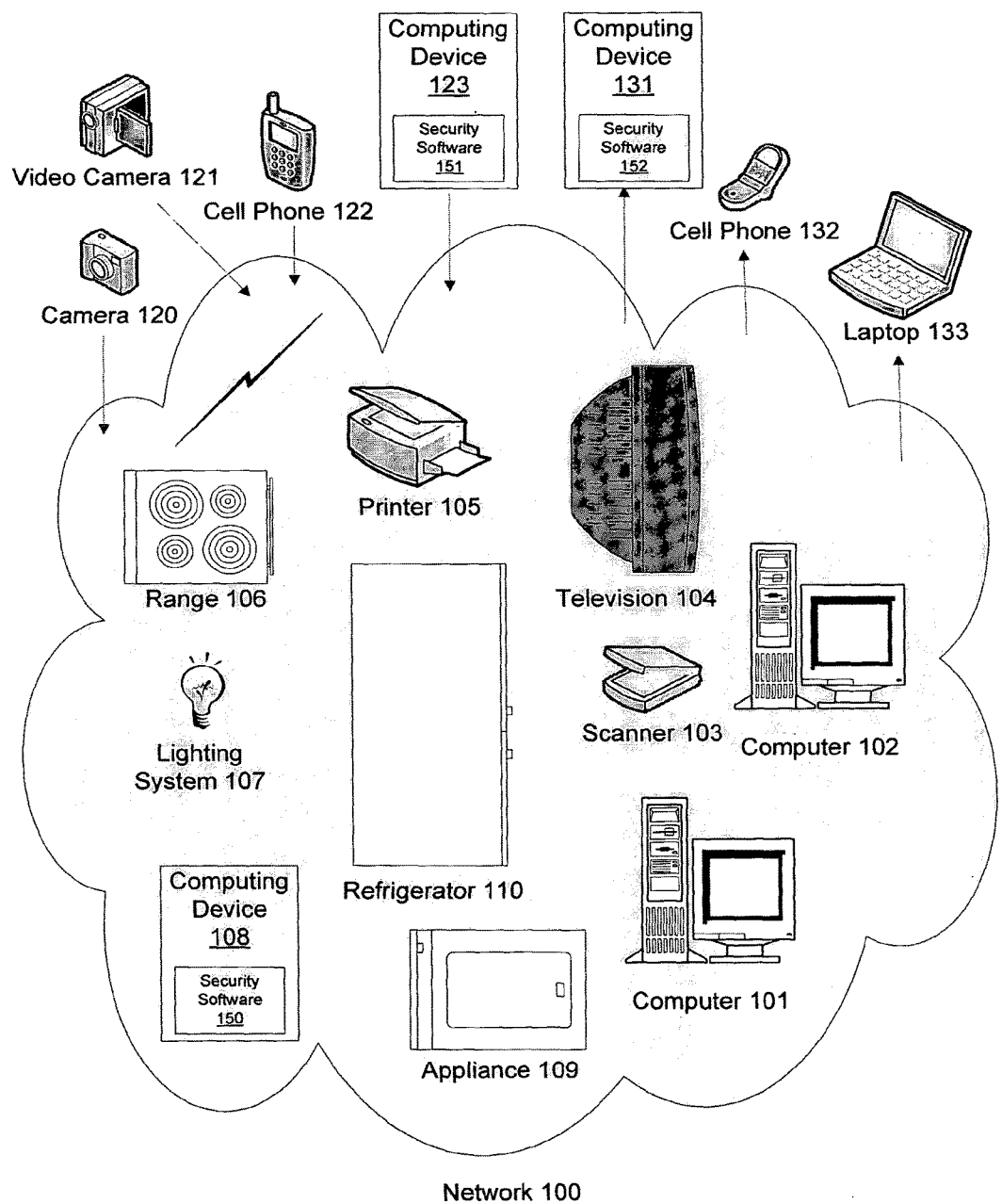

FIG. 1 illustrates a network 100 of computing devices. Many of the appliances in common home and office use today are becoming increasingly advanced and will soon allow for network connection. In this regard, computers 101 and 102, scanner 103, television 104, printer 105, range 106, lighting system 107, computing device 108, appliance 109, refrigerator 110, camera 120, video camera 121, cell phone 122, computing device 123, computing device 131, cell phone 132, and laptop 133 are all exemplary computing devices that may connect to lightweight network 100. Computing devices 108, 123, 131 are depicted generically to emphasize that devices connectable to a network can be any computing device that generally fits the description provided in FIG. 6. For example, they could be a gaming consoles, DVD players, stereo systems, surveillance devices, Personal Digital Assistants (PDAs), or any other computing devices. The devices of FIG. 1 may provide and consume network services.

Network security software 150, 151, and 152 is illustrated on devices 108, 123 and 131, respectively. Such security software may exist on any and all of the devices illustrated in FIG. 1. Software 150, 151, 152 implements aspects of the invention. In general, it allows for a security service that provides authorization and validation of devices connecting to a network 100, synchronization of security information, and replication of the security service as will be described below.

Figure 2A:
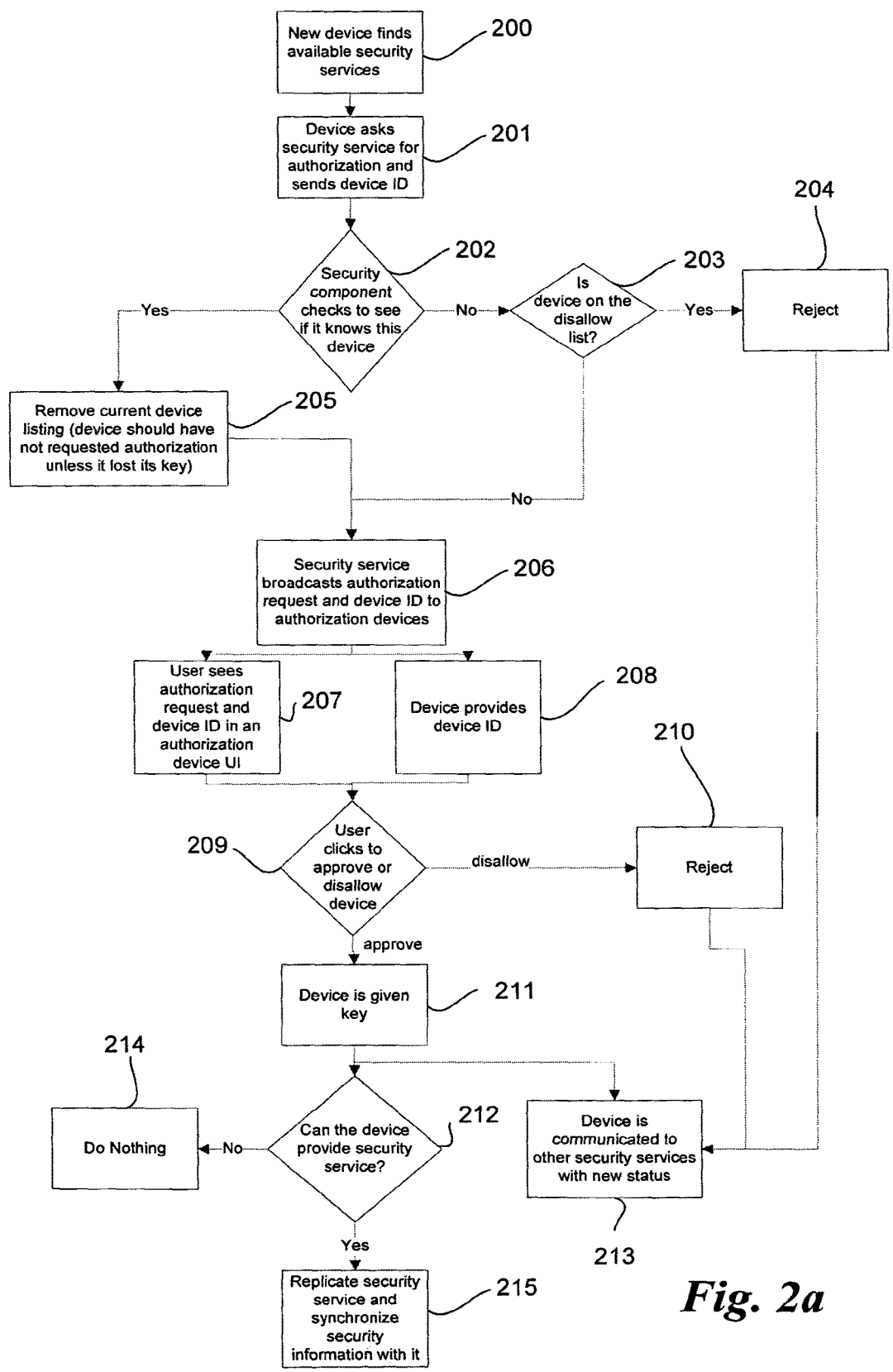
FIG. 2a is a flow diagram illustrating a process for authorizing a computing device to access network services.
Figure 2B:
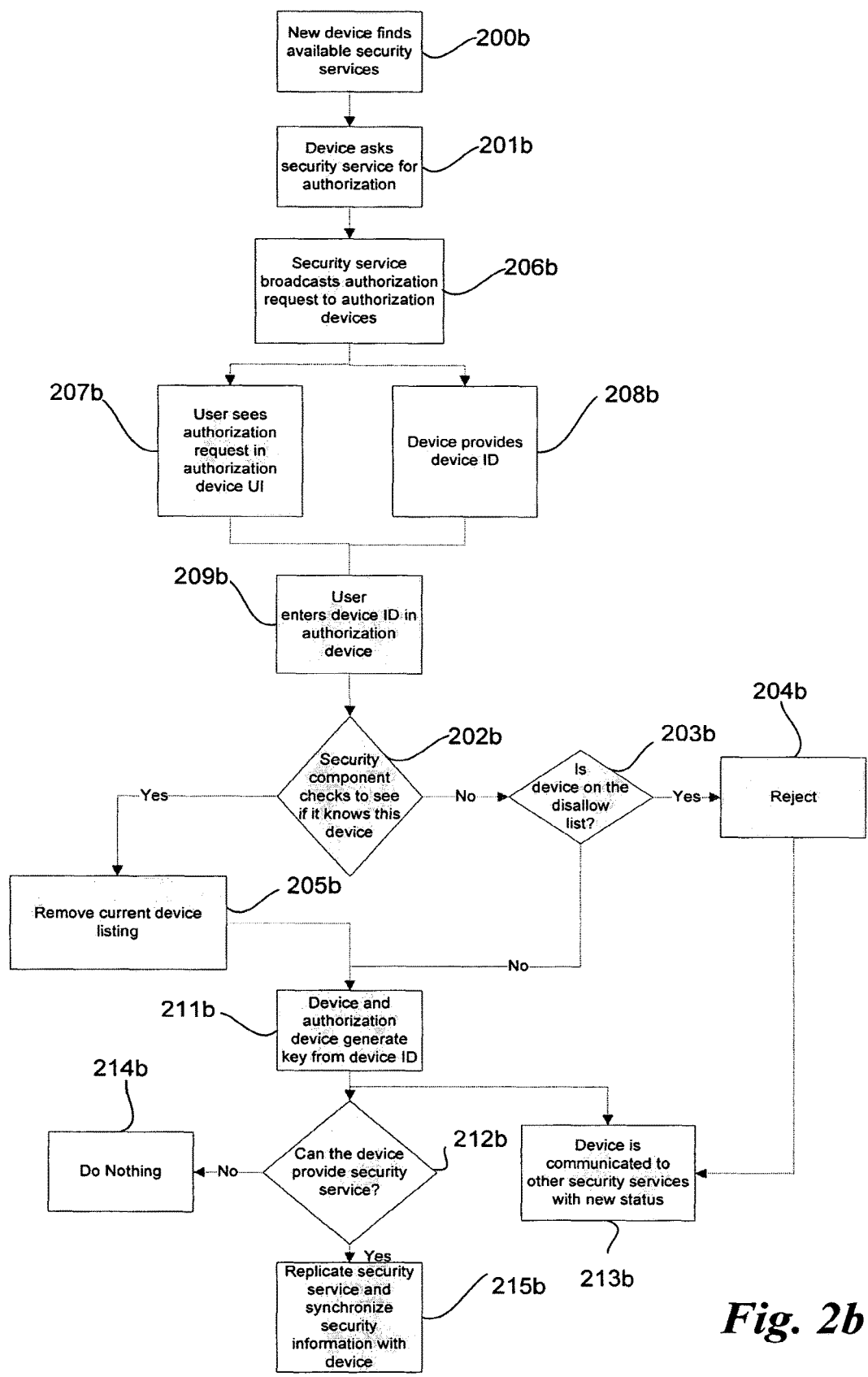
FIG. 2b is a flow diagram illustrating an alternative embodiment of a process for authorizing a computing device to access network services.

Authorization, as that term is used here, refers to providing a device, e.g. 123, with a key that allows access to network services. Authorization may include functions for seeking authorization when a device 123 enters network 100 for the first time, or when a previously authorized device, e.g. 121, loses its device key by virtue of key expiration or otherwise. Authorization may also include functions for granting or denying such authorization. For example, when device 123 enters network 100 and requests authorization, device 108 may take certain steps, as will be described below, for granting or denying the request. Authorization may also include functions for determining a scope of authorization. For example, a particular device 123 may be allowed to access some network services, or aspects of some network services, but not others. A process of authorizing devices, e.g., 122 and 123 entering the network 100 for the first time, or after losing a key, is illustrated in FIG. 2a and FIG. 2b.

Figure 3:
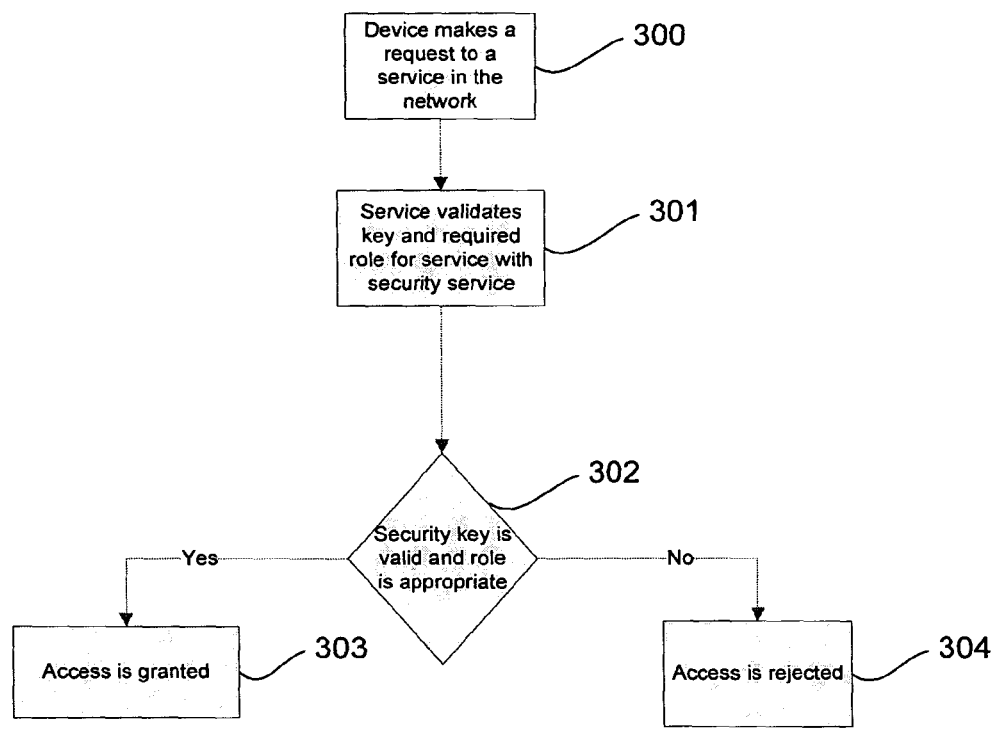
FIG. 3 is a flow diagram illustrating a process for an authorized computing device to access a network service.

Validation refers to determining whether a device, e.g., 108 is authorized to access a particular network service. Software 150, 151, 152 it may include functions for securely requesting a network service, e.g., by providing a key along with a network service request. It may also include functions for determining that a device 108 is authorized to access a network service, e.g., by checking whether a device key is valid, and checking that the service is within the scope of permitted network services. A process for validating devices requesting network services is illustrated in FIG. 3.

Figure 4:
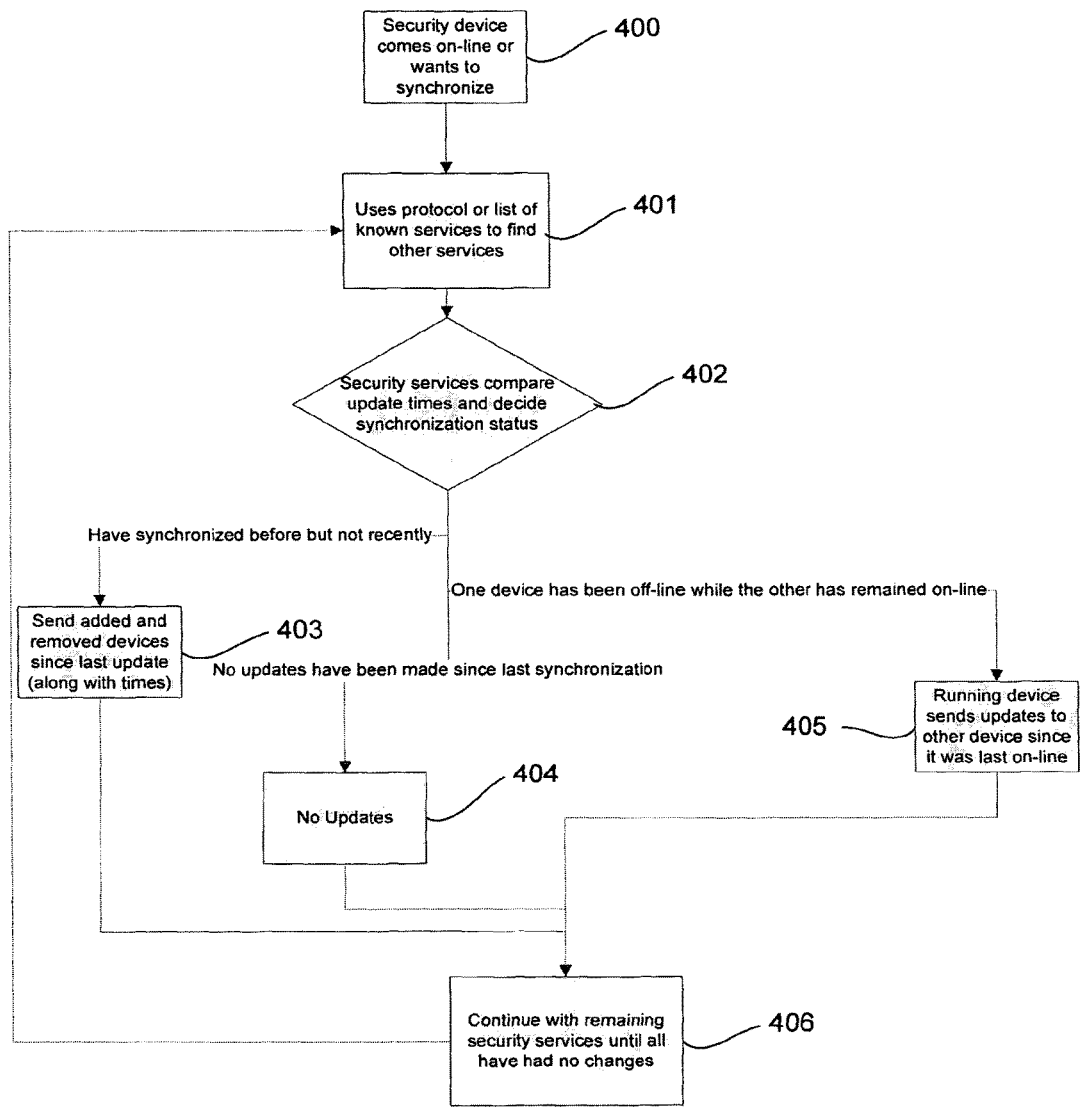
FIG. 4 is a flow diagram illustrating a process for synchronizing security information among the various computing devices in a network.

Synchronization of security information (synchronization) refers to communicating, among the various devices in network 100, information about which devices are and are not authorized to access network services. Synchronization may comprise providing updates to a list of keys which may be used to access network services. Synchronization may further include providing updates to a disallow list for devices which are not permitted to access network services. Synchronization may further provide information regarding a scope of allowed access to network services by the various devices 101-110 in network 100. Synchronization is illustrated in FIG. 4.

Finally, security software 150, 151, 152 may provide for replication of a security service (replication). Because lightweight networks are unpredictable in terms of which devices will be in network 100 at any given time, it is useful to allow a plurality of devices to provide a security service. If devices such as 123 that enter network 100 are capable of providing the security service for subsequent device authorization, device validation, and security information synchronization, they may be configured to do so by other devices, e.g. 108, in the network 100. Replication is referred to in FIGS. 2a and 2b.

Any subset of the functions described above with reference to authorization, validation, synchronization, and replication, may be included on a particular computing device. As such, software 150, 151, and 152 may include different subsets of the functions described above. For example, one device, e.g., 123 may include only software 152 for seeking authorization on a network 100 and for delivery of its key for validation when attempting to access a network service. Another device 108 may include software 150 for seeking authorization and validation, as well as for performing other aspects of authorization, validation, synchronization and replication.

In one embodiment, a computing device, e.g., 123, connects and requests authorization from the network 100 'cloud' of devices 101-110. The new device 123 can be approved to enter the network 100 in one-click by a user at a UI displayed at one or more authorization devices, e.g. 101-110 within the network 100. The term "authorization device" is used herein to refer to a device within network 100 that performs authorization of a new device 123. The term "new device" refers to a device entering network 100 for the first time, or a device which has lost its key by virtue of key expiration or otherwise. Where a plurality of devices 101-110 serve as authorization devices, authorization is possible regardless of which individual computing devices 101-110 are available at any given time. Upon authorization by any authorization device, the new device 123 can gain access to secure network services.

Network 100 may be implemented using any of a variety of network topologies and configurations. In accordance with an aspect of the invention, each entity 101-110, 120-123, 131-133 may contain discrete functional program modules that might make use of an API, or other object, software, firmware and/or hardware, to request network services of one or more of the other entities 101-110, 120-123, 131-133.

A network infrastructure may enable a host of network topologies such as client/server, peer-to-peer, or hybrid architectures. Many lightweight networks are peer-to-peer, as that term is understood in the industry, and the invention is well suited for such topologies. Client/server topologies are also appropriate for some embodiments of the invention. In the example of FIG. 1, any entity 101-110, 120-123, 131-133 can be considered a peer in a peer-to-peer topology, or a client, a server, or both, depending on the circumstances.

Computing devices 101-110, 120-123, 131-133 communicate with one another utilizing the functionality provided by protocol layer(s). For example, Hyper Text Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify peers, servers or client computers to each other. The network address can be referred to as a URL address. Communication can be provided over a communications medium, e.g., devices may be coupled to one another via TCP/IP connection(s) for high-capacity communication, or over a wireless connection, such as those supported by the popular 802.11b and 802.11g protocols.

Device communication and access to network services may be implemented using industry standard protocols. For example, network services including the device authorization service provided herein may be implemented using web services for which specific and standardized xml schemas have been created. A standardized schema for may be used to exchange/synchronize security information. Standardized exposed interfaces may allow device and software makers to make products that interoperate with the system provided herein. It will be appreciated that a number of such web service and other standards exist and are continuously updated and improved. Thus, where a specific web service or other industry standard is referenced herein, it should be understood that any version of such web service or other industry standard may be substituted.

Embodiments of the invention may also benefit from standardized interfaces for exchanging/synchronizing security information because this increases the availability and reliability of the security system. The more devices that participate in the network 100 "cloud" and can perform the tasks associated with the network security service, the less likely it will be that, at any given time, there are no devices that can serve as authorization devices or, conversely, can seek authorization or validation from a network that implements the invention.

The security services and replication services contemplated herein may have a web service interface, which enables different device types and platforms to all act as security service providers, as long as they can implement the web service.

Devices may use the WS-Discovery protocol when entering network 100 to conduct automatic security discovery and setup. In one embodiment, software 150, 151, 152 may interact with existing Universal Plug and Play (UPnP) security service interfaces, which enables the software to also securely interact with existing UPnP devices that support the UPnP security profile. UPnP is becoming the most popular way for devices to interact in the home, and therefore such embodiments are considered likely. Moreover, the current UPnP security profile is very weak, making it almost useless on its own. One advantage of an embodiment of the invention is thus to provide enhanced security to devices that interact using UPnP.

In summary, with respect to FIG. 1, a system is depicted whereby devices such as 123 can be authorized to connect to a network 100 comprising a plurality of computing devices 101-110. After connecting, device 123 can be validated when accessing one or more secure network services available via the other devices 101-110 in the network 100. Devices 101-110 in network 100 may perform synchronization and replication to ensure robust availability of a security service despite departure of some devices, e.g. 131-133 from the network 100. Techniques for authorizing, validating, synchronizing, and replicating will be explained in greater detail below.

FIG. 2a is a flow diagram illustrating a process for authorizing a computing device to access network services. A new device enters a network and asks to access a security service 200. To ask for a security service 200, an industry standard protocol such as WS-Discovery or UPnP Discovery may be used. The new device then asks for authorization from the security service and sends its device identifier (ID) to one or more authorizing devices 201. A security component on the authorizing device then checks if it recognizes the new device from a previous authorization 202. If the new device is not recognized, the authorizing device may determine if the new device is on a disallow list 203. If so, access to network services may be denied 204. If the new device is not on a disallow list, then the authorizing device may broadcast the authorization request to all secure devices on the network 206. Secure devices are generally to be understood as those that may serve as authorization devices.

If the authorizing device does recognize the new device, then the authorizing device may remove the current device listing and then proceed to step 206. As noted in the illustration, the new device should not have sent an authorization request unless it lost its key. If the new device still had its key, it would typically avail itself of the validation procedure illustrated in FIG. 3, rather than the authorization procedure illustrated in FIG. 2a or 2b.

Once the authorization request is broadcasted 206, a UI can be displayed on any or all secure devices. The UI prompts the user to authorize the new device 207. Meanwhile, the new device provides a device ID 208. The device ID may be provided in any number of ways, including, for example, displaying the ID on an electronically generated display, permanently inscribing the device ID on the device, for example on device housing, allowing the ID to be securely stored on removable media such as a Universal Serial Port (USB) flash drive, Compact Disk (CD), floppy disk, or other recordable media, including a Radio Frequency Identifier (RFID) tag in the device that is capable of communicating the device ID, and so forth as will be appreciated by those of skill in the art. The user may then compare the ID displayed in the UI with that provided by the new device. The user may approve or disallow the device 209. In general, it is contemplated that the user would not approve a device if the device ID displayed in the authorization device UI does not match the ID provided locally by the device. If the IDs do not match, the user may be approving a device other than the intended device, which may be a malicious device. However, in this embodiment, the user would have the opportunity to approve the new device even if the IDs do not match.

If the user disallows the device in step 209, then the device is denied access to network services 210. If the user approves the new device, the device is given a key to access network services 211. In either case, the device ID and device status, such as "authorized" or "rejected," may be communicated to the other secure devices on the network 213. At this point, the new device, if authorized, is permitted to access various secure network services available on the network.

The services available to the new device may be restricted in some circumstances. For example, the new device may be given access to a subset of available services based on a device class, or based on privileges of a user of the new device.

The remaining steps illustrated in FIG. 2a are directed to replication, i.e. further configuring the new device to act as an authorizing device for subsequent new devices requesting authorization or validation. In this regard, if it is determined that the new device can provide a security service in step 212, then security information and optionally software for performing a device authorization can be downloaded to the new device in step 215. If the new device cannot provide a security service, then as illustrated in step 214, no further action is necessary.

FIG. 2b is a flow diagram illustrating an alternative embodiment of a process for authorizing a computing device to access network services. First, the new device can find available security services 200b as in the FIG. 2a embodiment. Next, the new device may ask for authorization 201b. In this embodiment, no device ID is sent with the request.

Because no device ID is sent, steps 202-205 from FIG. 2a may be skipped at this juncture, and instead performed later, in steps 202b-205b.

In step 206b, the request is broadcasted without a device ID. The user sees the authorization request at an authorization device UI 207b. Once again, the device provides its device ID 208b via any number of avenues as explained above with reference to step 208 in FIG. 2a. This time, the user enters the new device ID in the authorization device 209b. The act of entering the device ID is considered to be using the device ID to approve the device. Entering the ID may be accomplished by typing the ID at an authorization device keyboard, plugging a USB flash drive into the authorization device, bringing a new device RFID tag within range of an RFID reader, and so forth.

Steps 202b-205b generally mirror steps 202-205 from FIG. 2a. Once an authorization device has the new device ID, it can determine whether authorization should be granted 202b by checking against a disallow list 203b. It can also remove a current device listing if one exists 205b.

Next, a key can be separately generated from the device ID in both the new device and the authorization device 211b. This avoids sending the key over the network. This can be considered more secure than the FIG. 2a embodiment in some situations, because the initial key is never transmitted over the network, preventing eavesdropping attacks.

Finally, as with FIG. 2a, the device ID and device status, such as "authorized" or "rejected," may be communicated to the other secure devices on the network 213b. If authorized, the new device is permitted to access various secure network services available on the network. Replication and synchronization may be performed as illustrated in steps 212b, 214b, and 215b and as explained above.

FIG. 3 is a flow diagram illustrating device validation. As such, FIG. 3 provides a process for an authorized computing device to access a network service. Once a device is authorized, the procedure illustrated in FIG. 2a or 2b need not be repeated because the device has already obtained a key with which it may access network services. This is true even if the authorized device leaves and subsequently rejoins the network, for example by being turned off, or physically removed from a network connection or wireless network communication range. However, keys may be configured to expire after a predetermined time interval, requiring reauthorization of a device pursuant to FIG. 2a or 2b from time to time.

As illustrated in FIG. 3, a device that has a key may simply request a network service 300. Although not required, the device may use any standardized web service protocol, as discussed above, to make this request. The network service may validate the device key and determine any device role, device user privileges, and the like with the security service 301, such as a security service accessible via any of the devices in the network 100 displayed in FIG. 1, and implemented using security software such as 150. If the valid security key and appropriate role are verified in step 302, then access to the requested service is granted 303. If not, then access may be rejected 304. Additional processes may be in place to troubleshoot situations in which access is rejected 304.

FIG. 4 is a flow diagram illustrating a process for synchronizing security information among various computing devices in a network. The process of FIG. 4 is also discussed in U.S. Pat. No. 7,606,838.

Among other benefits, synchronization allows device authorization to operate smoothly in a dynamic network. Synchronization allows authorization to be conducted by any computing device in a network that is capable of serving as an authorizing device, rather than exclusively at a centralized server. Thus, one advantage of this aspect of the invention is that it provides an authorization and validation scheme that succeeds in providing a degree of security in peer-to-peer networks, because any of a variety of computing devices may authorize another device to enter the network or validate access to a network service. Another advantage of the invention is that it provides an authorization and validation scheme that succeeds in dynamic networks, where computing devices may frequently enter, leave and rejoin the network.

Synchronization, as illustrated in FIG. 4, enables security decisions and current policies to be distributed around the network so authorizing devices can uniformly authorize and validate device access to network services. The authorizing devices may optionally automatically synchronize security information. Synchronization between authorizing devices need not contain device state information. This makes security easy to handle when computing devices enter, leave, and rejoin a network. It also helps to ensure the efficiency of security information synchronization, by minimizing the amount of information that is synchronized. As a result, any type of device, even devices with a relatively low amount of memory and CPU power can act as authorizing devices. Authorizing devices can be, but need not be Personal Computers (PCs) or equally powerful devices. This is important because in many lightweight networks, the likelihood of powerful as well as less powerful devices entering, leaving, and rejoining the network is high. Many people shut down their home or small business PCs or laptops at night, over weekends, or while at work. Simple, reliable security authorization that may be provided by devices with little computing power enhances reliability in this environment.

With reference to FIG. 4, step 400 illustrates that a security device initiates a synchronization. It may come online, or experience some other event that triggers a synchronization. One such event is an authorization decision as illustrated in FIGS. 2a and 2b. A security device may use any protocol, such as WS-Discovery or UPnP Discovery, or a locally stored list of known network services, to determine information that should be synchronized 401. This involves connecting to a another secure device that provides at least the security service. The security services on the two connected devices may then compare update times and determine whether a synchronization is necessary 402. Depending on the result of the comparison, any of steps 403, 404, or 405 may follow.

If the services have synchronized, but not recently, then the synchronizing devices may send each other identifiers for any added and/or removed devices, along with the times of such adding or removing 403. If no updates have been made since a last synchronization, then no synchronization is necessary 404. Finally, if one device has been off-line while the other remained on-line, then the device that remained on-line sends updates to the other device, including any identifiers for any added and/or removed devices, along with the times of such adding or removing, since the off-line device went off-line.

As illustrated in step 406, steps 401-405 may be repeated until the synchronizing device has synchronized will all available security devices. This ensures that a synchronizing device, and moreover all security devices, have the latest security information.

FIG. 5 provides a flow diagram illustrating a process for authorizing a computing device to access a network service. The process of FIG. 5 may be carried out by any authorization device that provides the security service contemplated herein. The security service is implemented as a software application, or a set of computer readable instructions to be followed by a device. Thus, in one embodiment of the invention, the process of FIG. 5 may be generally reflected in computer readable instructions available to a networked security device.

The steps illustrated in FIG. 5 should be familiar at from a study of FIGS. 2a, 2b, and the corresponding description. First, a broadcast signal is detected 501. Next, the authorization request is pulled from the broadcast signal 502. The authorization device then displays a representation of the request in a UI 503.

In embodiments that send a device ID in the broadcast, the device ID can be displayed in the UI. A user then approves or disallows the device 504. The user indicates approval in the UI with a mouse click or keystroke, after comparing the device ID in the authorization device UI with that provided by the device.

In embodiments where the device ID is not sent in the broadcast, i.e., embodiments corresponding to FIG. 2b, the user uses the device ID to approve the device by entering the ID provided by the device into the authorization device. By entering the ID, the user is implying approval of the device 504.

In either of the above embodiments for step 504, the user approval may be accompanied by an automated approval process, such as comparing the device ID to a disallow list as described with reference to FIGS. 2a and 2b. If the device is disallowed by the user or the automated process, the disallowed status of the device may be updated on all security devices 508.

If the device is approved in step 504, then a scope of appropriate access may be determined for the device 505. A key may be generated for the device 506. The key is either generated by the authorization device and delivered to the approved device, or generated independently at both the authorization device and the approved device. The key may then be used to access secured network services.

All security services on the network may then be synchronized by the authorization device, so that they will permit the approved device to access appropriate other network services 507. This is accomplished by sending the other security services the device key for the approved device. When the approved device attempts to access a service, it will also send its key. The key can be first validated by a security service, and then the device can be permitted to access any other approved services. If the device permits, the security service may also be replicated to the device 508, so that the device may participate in future device approvals and validations.

FIG. 6 illustrates a basic computing device 600 to precisely point out the various elements of a computing device suitable for use in the context of the invention.

In its most basic configuration, computing device 600 typically includes at least one processing unit 602 and memory 603. Depending on the exact configuration and type of computing device, memory 603 may be volatile (such as RAM 603A), non-volatile (such as ROM 603B, flash memory, etc.) or some combination of the two. Device 600 may also have additional features/functionality. For example, device 600 may also include additional storage (removable 604 and/or non-removable 605) including, but not limited to, magnetic or optical disks or tape.

Computer storage media includes volatile and nonvolatile, removable and non-removable media implemented in any method or technology for storage of information such as computer readable instructions, data structures, program modules or other data. Computer storage media may be in the form of an article of manufacture such as a disk, USB flash drive, hard drive, and so forth. Memory 604, removable storage 608 and non-removable storage 660 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 may also contain communications connection(s) 608 that allow the device to communicate with other devices. Communications connection(s) 608 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. An article of manufacture, as that term is used here, may comprise a modulated data signal that is sent across a wire to be recorded or used at a computing device. By way of example, and not limitation, communication media includes wired media such as a wired network or direct-wired connection, and wireless media such as acoustic, RF, infrared and other wireless media. The term computer readable media as used herein includes both storage media and communication media.

Device 600 may also have input device(s) 607 such as keyboard, mouse, pen, voice input device, touch input device, etc. Output device(s) 606 such as a display, speakers, printer, etc. may also be included. These aspects of a device 600 are well known in the art and need not be discussed at length here.

FIG. 7 illustrates various functional elements of a computing device which may be used in a process for obtaining authorization to access a network service. By comparison to FIG. 5, it will be noted that while FIG. 5 illustrates a process to be carried out by an authorizing device, FIG. 7 illustrates functional components that may be present in a device that requests approval from an authorizing device. A process to be carried out by a requesting device may be gleaned from a study of the functional components depicted in FIG. 7.

Computing device 700 generally may comprise means for detecting that the computing device is operably connected to a network 701, means for determining if said computing device has a key to access a network service available on the network 702, and means for sending an authorization request to a security service available on the network 703. The means for sending an authorization request 703 may be triggered if it is determined by 702 that computing device 700 does not have an access key with which to access network services available on the detected network. Component 703 may also comprise means for procuring a key to access network services, either by receiving the key from an authorization device or by generating a key according to instructions provided by the authorization device.

Computing device 700 may further comprise means for providing a device identifier 704. This means may be an engraved device ID on the device housing, a display of the ID, an RFID tag, a means to record the ID to a USB flash drive, and so forth as discussed above. A network access management component 706 may be present to manage the process of network access authorization. Finally, computing device 700 may comprise means for using the key to access one or more network services 705.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A method for securing a network comprising a plurality of devices, comprising:
    receiving, from a first device, an authorization request to access at least one network service;
    broadcasting the authorization request;
    presenting a representation of the authorization request in an interface;
    receiving, from said first device, a device identifier (ID);
    determining that the first device is not included in a list associated with disallowed devices:
    receiving, via said interface, an approval of the first device, wherein said approval is performed using the device ID;
    generating, from the device ID, a key for the first device, wherein the key is also separately generated from the device ID by the first device, wherein said at least one network service may be accessed using said key;
    replicating a security service to the first device based on a determination that the first device can provide the security service and serve as an authorizing device for subsequent device approvals and validations; and
    synchronizing, to the first device and to other devices of the plurality of devices, security information indicative of access to said at least one network service.

2. The method of claim 1, further comprising sending, by a second device to a third device, an indication that the first device is authorized to access said at least one network service.

3. The method of claim 1, wherein said authorization request comprises the device ID.

4. The method of claim 3, wherein said approval is performed based on a comparison of the device ID in said representation of the authorization request with the device ID provided by said first device.

5. The method of claim 1, wherein said approval is performed by entering the device ID provided by said first device.

6. A method for securing a network comprising a plurality of devices, comprising:
    sending, by a first device, an authorization request to access at least one network service, wherein the authorization request is broadcasted and a representation of the authorization request is presented in an interface;
    providing, by said first device, a device identifier (ID), wherein an approval of the first device is received, via said interface, and wherein said approval is performed using the device ID, wherein it is determined that the first device is not included in a list associated with disallowed devices;
    generating, from the device ID, by the first device, a key for the first device, wherein the key is also separately generated from the device ID by one or more other devices, wherein said at least one network service may be accessed using said key;

replicating, by the first device, a security service based on a determination that the first device can provide the security service and serve as an authorizing device for subsequent device approvals and validations: and synchronizing, by the first device and to other devices of the plurality of devices, security information indicative of access to said at least one network service.

7. The method of claim 6, wherein said authorization request comprises the device ID.

8. The method of claim 7, wherein said approval is performed based on a comparison of the device ID in said representation of the authorization request with the device ID provided by said first device.

9. The method of claim 6, wherein said approval is performed by entering the device ID provided by said first device.

10. A computing system for securing a network comprising a plurality of devices, comprising:

one or more processors; and one or more memories having stored therein instructions that, upon execution by the one or more processors, cause the computing system to perform operations comprising:

receiving, from a first device, an authorization request to access at least one network service;

broadcasting the authorization request;

presenting a representation of the authorization request in an interface;

receiving, from said first device, a device identifier (ID);

receiving, via said interface, an approval of the first device, wherein said approval is performed using the device ID and serve as an authorizing device for subsequent device approvals and validations, wherein the operations further comprise determining that the first device is not included in a list associated with disallowed devices;

generating, from the device ID, a key for the first device, wherein the key is also separately generated from the device ID by the first device, wherein said at least one network service may be accessed using said key;

replicating a security service to the first device based on a determination that the first device can provide the security service; and synchronizing, to the first device and to other devices of the plurality of devices, security information indicative of access to said at least one network service.

11. The computing system of claim 10, wherein said authorization request comprises the device ID.

12. The computing system of claim 11, wherein said approval is performed based on a comparison of the device ID in said representation of the authorization request with the device ID provided by said first device.

13. The computing system of claim 10, wherein said approval is performed by entering the device ID provided by said first device.

14. The computing system of claim 10, wherein the operations further comprise sending, by a second device to a third device, an indication that the first device is authorized to access said at least one network service.

* * * * *